(12) United States Patent
Koiso

(10) Patent No.: US 12,125,316 B2
(45) Date of Patent: Oct. 22, 2024

(54) VIDEO PROCESSING DEVICE, VIDEO PROCESSING METHOD, AND RECORDING MEDIUM FOR VIDEO PROCESSING

(71) Applicant: JVCKENWOOD Corporation, Yokohama (JP)

(72) Inventor: Hisashi Koiso, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 366 days.

(21) Appl. No.: 17/389,451

(22) Filed: Jul. 30, 2021

(65) Prior Publication Data

US 2021/0357619 A1 Nov. 18, 2021

Related U.S. Application Data

(63) Continuation of application No. PCT/JP2020/001278, filed on Jan. 16, 2020.

(30) Foreign Application Priority Data

Jan. 30, 2019 (JP) ................................. 2019-014444

(51) Int. Cl.
*G06K 9/00* (2022.01)
*G06T 5/92* (2024.01)
(Continued)

(52) U.S. Cl.
CPC .............. *G06V 40/193* (2022.01); *G06T 5/92* (2024.01); *G06V 10/758* (2022.01);
(Continued)

(58) Field of Classification Search
None
See application file for complete search history.

(56) References Cited

U.S. PATENT DOCUMENTS 6,898,300 B1 * 5/2005 Iwaki ........................ G06T 5/50
382/117
7,130,453 B2 * 10/2006 Kondo ................... G06V 40/19
382/199
(Continued)

FOREIGN PATENT DOCUMENTS

JP 2014-049863 A 3/2014
JP 6033006 B2 * 11/2016

OTHER PUBLICATIONS

Office Action issued for corresponding European Patent Application No. 20747620.1 mailed Nov. 25, 2022, 8 pages.
(Continued)

*Primary Examiner* — Feng Niu
(74) *Attorney, Agent, or Firm* — Shih IP Law Group, PLLC

(57) ABSTRACT

A video processing device includes a video acquirer, a video recognition unit, a luminance value acquirer, and a luminance adjuster. The video acquirer acquires a video in which the face of an image capture object is captured. The video recognition unit recognizes an iris part and an eyelid part in a video acquired by the video acquirer. The luminance value acquirer acquires a luminance value of each of the iris part and the eyelid part recognized by the video recognition unit. The luminance adjuster adjusts a luminance value of a video such that the luminance values of the iris part and the eyelid part acquired by the luminance value acquirer respectively become closer to a certain iris luminance upper threshold in the iris part and a certain eyelid luminance lower threshold in the eyelid part.

7 Claims, 11 Drawing Sheets

(51) Int. Cl.

| | | |
|---|---|---|
| *G06V 10/75* | (2022.01) | |
| *G06V 20/59* | (2022.01) | |
| *G06V 40/16* | (2022.01) | |
| *G06V 40/18* | (2022.01) | |
| *H04N 23/611* | (2023.01) | |
| *H04N 23/71* | (2023.01) | |
| *H04N 23/76* | (2023.01) | |
| *B60W 40/08* | (2012.01) | |
| *G08B 21/06* | (2006.01) | |

(52) U.S. Cl.
CPC .......... *G06V 20/597* (2022.01); *G06V 40/161* (2022.01); *H04N 23/611* (2023.01); *H04N 23/71* (2023.01); *H04N 23/76* (2023.01); *B60W 2040/0872* (2013.01); *B60W 2420/403* (2013.01); *G06T 2207/10016* (2013.01); *G06T 2207/30201* (2013.01); *G08B 21/06* (2013.01)

(56) References Cited

U.S. PATENT DOCUMENTS

| | | | | | |
|---|---|---|---|---|---|
| 7,539,342 | B2* | 5/2009 | Tabata | ............... | G06T 5/70 |
| | | | | | 358/518 |
| 7,852,379 | B2* | 12/2010 | Aoki | ............... | H04N 23/76 |
| | | | | | 348/370 |
| 7,916,169 | B2* | 3/2011 | Omi | ............... | G06V 20/597 |
| | | | | | 348/78 |
| 7,957,566 | B2* | 6/2011 | Suzuki | ............... | A61B 3/10 |
| | | | | | 382/117 |
| 8,385,680 | B2* | 2/2013 | Tada | ............... | G06T 5/90 |
| | | | | | 382/274 |
| 8,401,328 | B2* | 3/2013 | Ikeda | ............... | H04N 25/625 |
| | | | | | 382/274 |
| 8,693,784 | B2* | 4/2014 | Kadoya | ............... | G06V 40/193 |
| | | | | | 382/199 |
| 9,053,354 | B2* | 6/2015 | Aviv | ............... | G06V 40/161 |
| 9,349,037 | B2* | 5/2016 | Cséfalvay | ............... | G06T 7/75 |
| 9,811,888 | B2* | 11/2017 | Matsunaga | ............... | H04N 1/624 |
| 10,380,420 | B2* | 8/2019 | Chien | ............... | G06F 3/147 |
| 11,554,046 | B2* | 1/2023 | Gonzalez | ............... | G06T 3/4084 |
| 11,623,347 | B2* | 4/2023 | Hayashi | ............... | G06F 3/013 |
| | | | | | 700/245 |
| 11,763,598 | B2* | 9/2023 | Yachida | ............... | G06V 40/19 |
| | | | | | 382/103 |
| 11,779,205 | B2* | 10/2023 | Arita | ............... | A61B 3/14 |
| | | | | | 382/128 |
| 2003/0118217 | A1* | 6/2003 | Kondo | ............... | G06V 40/19 |
| | | | | | 382/209 |
| 2005/0196067 | A1* | 9/2005 | Gallagher | ............... | G06T 5/005 |
| | | | | | 382/167 |
| 2005/0271295 | A1* | 12/2005 | Tabata | ............... | H04N 1/628 |
| | | | | | 382/167 |
| 2008/0079842 | A1* | 4/2008 | Aoki | ............... | H04N 23/76 |
| | | | | | 348/E5.041 |
| 2008/0101659 | A1 | 5/2008 | Hammoud et al. | | |
| 2008/0226139 | A1* | 9/2008 | Suzuki | ............... | G06V 40/19 |
| | | | | | 382/117 |
| 2008/0303915 | A1* | 12/2008 | Omi | ............... | G06V 40/166 |
| | | | | | 348/222.1 |
| 2009/0060293 | A1* | 3/2009 | Nagao | ............... | G06F 21/32 |
| | | | | | 382/118 |
| 2010/0014775 | A1* | 1/2010 | Ikeda | ............... | H04N 25/625 |
| | | | | | 382/274 |
| 2010/0034458 | A1* | 2/2010 | Tada | ............... | G06T 5/40 |
| | | | | | 382/167 |
| 2011/0110589 | A1 | 5/2011 | Yen et al. | | |
| 2015/0186720 | A1 | 7/2015 | Tsou et al. | | |
| 2015/0262342 | A1* | 9/2015 | Matsunaga | ............... | G06T 5/40 |
| | | | | | 382/195 |
| 2016/0063305 | A1* | 3/2016 | Matsunaga | ............... | G06V 40/193 |
| | | | | | 382/167 |
| 2019/0279070 | A1* | 9/2019 | Hayashi | ............... | G06T 13/40 |
| 2020/0154995 | A1* | 5/2020 | Yabusaki | ............... | G06T 7/0012 |
| 2021/0034887 | A1* | 2/2021 | Tahara | ............... | G06V 40/16 |
| 2021/0212561 | A1* | 7/2021 | Arita | ............... | A61B 3/14 |
| 2021/0244565 | A1* | 8/2021 | Gonzalez | ............... | A61F 9/00827 |
| 2022/0036046 | A1* | 2/2022 | Yachida | ............... | G06V 40/193 |

OTHER PUBLICATIONS

International Preliminary Examination Report on Patentability (I) with an English translation from International Application No. PCT/2020/001278 mailed Jul. 27, 2021, 10 pages.

International Search Report from PCT Application No. PCT/JP2020/001278 with English translation mailed Mar. 24, 2020, 5 pages.

Extended European Search Report from Application No. 20747620.1 mailed Feb. 10, 2022, 11 pages.

A. Ghaffari, et al., "Iris Biometrics Recognition in Security Management", Springer International Publishing AG 2017, V. Chang et al. (Eds.): Enterprise Security, LNCS 10131, pp. 73-96, 2017.

F. Jan., "Segmentation and Localization Schemes for Non-Ideal Iris Biometric Systems", Signal Processing 133 (2017) pp. 192-212.

Z. Hammal., "Facial Features Segmentation, Analysis and Recognition of Facial Expressions Using the Transferable Belief Model", Jun. 29, 2006, 233 pages.

\* cited by examiner

VIDEO PROCESSING DEVICE, VIDEO PROCESSING METHOD, AND RECORDING MEDIUM FOR VIDEO PROCESSING

CROSS-REFERENCE TO RELATED APPLICATION

This application is a continuation of application No. PCT/JP2020/001278, filed on Jan. 16, 2020, and claims the benefit of priority from the prior Japanese Patent Application No. 2019-014444, filed on Jan. 30, 2019, the entire content of which is incorporated herein by reference.

BACKGROUND OF THE INVENTION

1. Field of the Disclosure

The present invention relates to a video processing device, a video processing method, and a recording medium for video processing.

A dashboard camera mounted on a vehicle, for example, captures videos of the outside of the vehicle or the inside of the vehicle cabin and stores the videos in a storage device. When the inside of the vehicle cabin is captured, the state in the vehicle cabin is stored as a video, and the driver is mainly captured in the video to be stored.

For example, Patent Literature 1 discloses an image processing device that performs image processing on a captured image of an object irradiated with infrared light. The control microcomputer of the image processing device controls a face detection unit to detect a face region of the object in the image and detects an iris part in the face region. The control microcomputer controls a luminance change unit to perform iris correction processing for decreasing luminance of the iris part to predetermined luminance. When the image processing device captures an object, such as a person, irradiated with infrared light in a dark place, the image processing device performs the iris correction processing to obtain an image with no incongruity in the impression of the face.

Patent Literature 1: Japanese Unexamined Patent Application Publication No. 2014-049863

SUMMARY OF THE INVENTION

A conventional image processing device as described in Patent Literature 1 obtains an image with no incongruity in the impression of the face by decreasing the luminance of the iris part in the image captured with high luminance. However, analyzing the state of the object, such as the degree of opening of an eye, based on a face image, for example, is not considered. To detect the contour of an eye and analyze the eye part, such as the degree of opening of the eye, by means of an image processing device, for example, luminance adjustment is required in a region including the eyelid, not only in the iris part, of the captured image.

The present invention has been made in view of such circumstances, and a purpose thereof is to provide a video processing device, a video processing method, and a recording medium for video processing for enabling luminance adjustment suitable for analysis related to an eye part.

A video processing device according to one aspect of the present embodiment includes: a video acquirer that acquires a video in which the face of an image capture object is captured; a video recognition unit that recognizes an iris part and an eyelid part in the video acquired by the video acquirer; a luminance value acquirer that acquires a luminance value of each of the iris part and the eyelid part recognized by the video recognition unit; and a luminance adjuster that adjusts a luminance value of the video such that the luminance values of the iris part and the eyelid part acquired by the luminance value acquirer respectively become closer to a predetermined iris luminance upper threshold in the iris part and a predetermined eyelid luminance lower threshold in the eyelid part.

Another aspect of the present embodiment relates to a video processing method. The video processing method includes: acquiring a video in which the face of an image capture object is captured; recognizing an iris part and an eyelid part in the video acquired in the acquiring a video; acquiring a luminance value of each of the iris part and the eyelid part recognized in the recognizing; and adjusting a luminance value of the video such that the luminance values of the iris part and the eyelid part acquired in the acquiring a luminance value respectively become closer to a predetermined iris luminance upper threshold in the iris part and a predetermined eyelid luminance lower threshold in the eyelid part.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
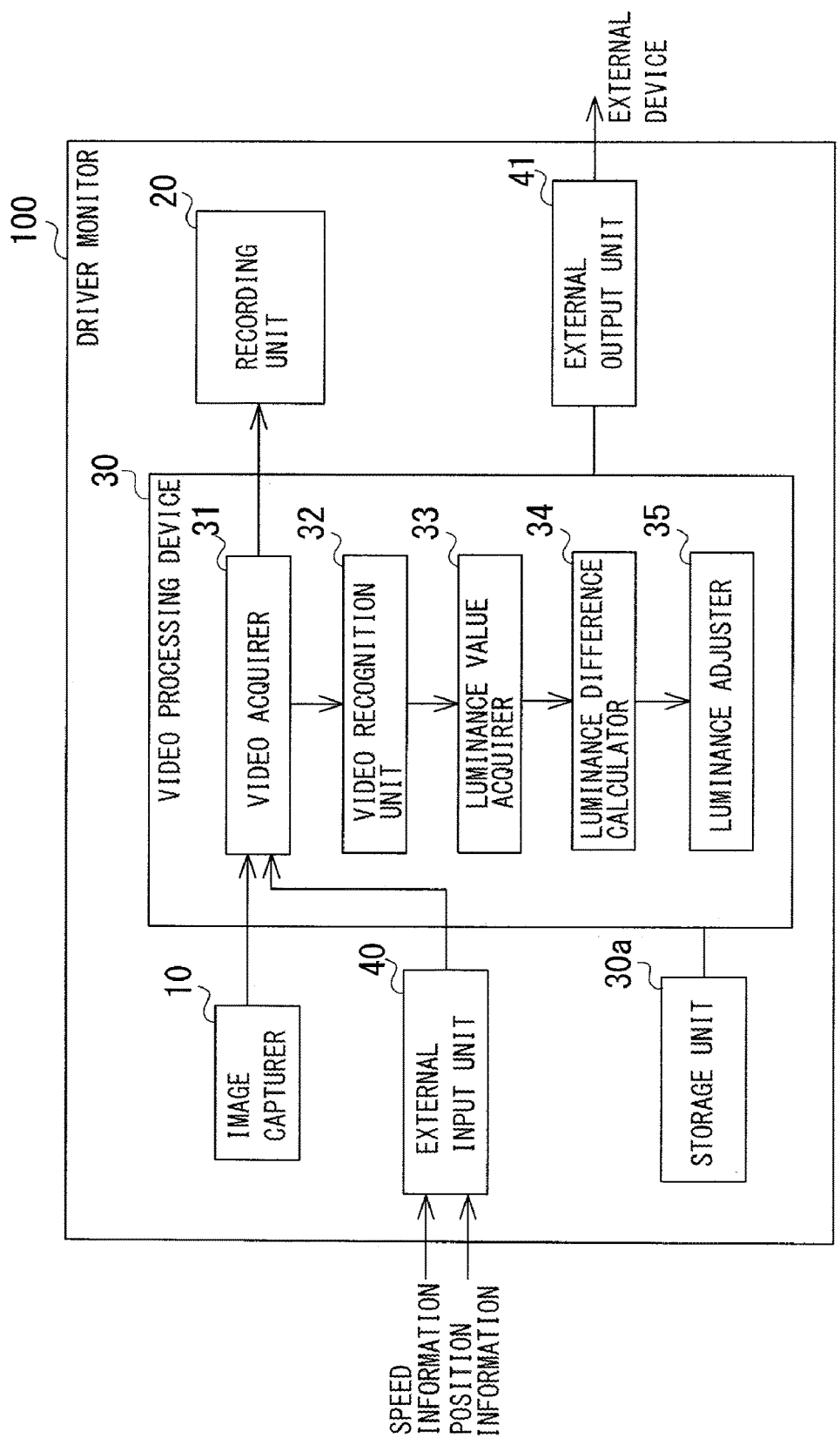
FIG. 1 is a block diagram that illustrates a configuration of a driver monitor that includes a video processing device according to a first embodiment.

The invention will now be described by reference to the preferred embodiments. This does not intend to limit the scope of the present invention, but to exemplify the invention. In the following, the present invention will be described based on preferred embodiments with reference to FIGS. 1 through 7. Like reference characters denote like or corresponding constituting elements and members in each drawing, and repetitive description will be omitted as appropriate. Further, in each drawing, part of a member less important in describing embodiments may be omitted.

First Embodiment

FIG. 1 is a block diagram that illustrates a configuration of a driver monitor 100 that includes a video processing device 30 according to the first embodiment. The driver monitor 100 is mounted on a vehicle to capture images of the inside of the vehicle cabin continuously in time. The driver monitor 100 may be set to record the captured videos, or to discard the captured videos without recording them. The driver monitor 100 may be disposed on the dashboard at the lower part of the vehicle windshield, for example. The video processing device 30 of the driver monitor 100 captures the driver of the vehicle as an image capture object, for example, and recognizes an eye in the face of the image capture object thus captured.

The video processing device 30 acquires luminance values of an eyelid part and an iris part and adjusts each of the luminance values. In the face of an image capture object irradiated with infrared light, the luminance value of the iris part may sometimes become higher, and the contrast between the eyelid part and the iris part captured with high luminance is generally decreased. Based on the luminance values of the eyelid part and the iris part, the video processing device 30 performs luminance adjustment such as to increase the contrast.

In the video of which the luminance has been adjusted by the video processing device 30, the contours of the both eyes can be easily recognized, for example, and the video is suitably used for analysis related to the eye parts, such as the degree of opening of an eye and the tilt of each eye. Also, the boundary between an eye and an eyelid can be favorably recognized. Although description regarding a function for analysis related to the eye parts is omitted in the present embodiment, the video processing device 30 may be provided with such a function for analysis related to the eye parts, such as the degree of opening of an eye and the tilt of each eye. Also, based on the videos accumulated by or output by the video processing device 30, the analysis related to the eye parts may be performed in an external device. The function for analysis related to the eye parts including the degree of opening of an eye and the tilt of each eye may be used to judge the degree of sleepiness or the emotional state (such as a normal state or a state of tension) of the image capture object, for example.

The driver monitor 100 includes an image capturer 10, a recording unit 20, the video processing device 30, an external input unit 40, and an external output unit 41, for example. The image capturer 10 may be a camera including a detector, such as a CCD, and captures the driver, for example, in the vehicle as the image capture object. To capture the image capture object, such as the driver, even in a dark condition during the nighttime, the image capturer 10 emits infrared light to the image capture object as appropriate. The image capturer 10 acquires videos continuously in time and transmits the videos to a video acquirer 31 of the video processing device 30, as will be described later.

The recording unit 20 may be a detachable medium, such as an SD card or a USB stick, or a hard disk, for example, and is capable of recording and deleting videos acquired by the video acquirer 31. In the following, a configuration including the recording unit 20 will be described; however, when the driver monitor 100 does not include a portion for recording videos, the recording unit 20 need not be provided. When the recording unit 20 is made attachable to and detachable from the driver monitor 100, the recording unit 20 can be detached from the driver monitor 100, and the videos may be reproduced on a different PC or the like, for example.

The external input unit 40 acquires, from an external device, vehicle speed information, vehicle position information, and the like. Also, the external output unit 41 outputs, to an external device, video information processed by the video processing device 30, for example. The driver monitor 100 may be set to record or output, to the outside, a video to which the speed information, position information, and the like acquired at the external input unit 40 is added.

The video processing device 30 includes the video acquirer 31, a video recognition unit 32, a luminance value acquirer 33, a luminance difference calculator 34, and a luminance adjuster 35. The video processing device 30 may be constituted by a CPU, for example, and operates according to a computer program to perform the processing of each of the abovementioned units. A storage unit 30a is constituted by a data storage device, such as random access memory (RAM), flash memory, or a hard disk storage device, and stores a computer program or the like executed in the video processing device 30. The storage unit 30a also stores a recognition dictionary used to recognize the face, an eye, and the like of the image capture object in a captured video.

The video acquirer 31 acquires a video captured by the image capturer 10 to perform processing, such as data compression, thereon and outputs the video to the recording unit 20. The video acquirer 31 may be configured to include the image capturer 10.

Based on the recognition dictionary stored in the storage unit 30a, the video recognition unit 32 recognizes the face or an eye of the image capture object in the video input from the video acquirer 31. The recognition dictionary stored in the storage unit 30a includes shape data of faces and eyes, for example. The video recognition unit 32 extracts a shape pattern appearing on a video and performs matching with the shape data included in the recognition dictionary to recognize the face or an eye, for example. By means of publicly-known methods for image recognition processing developed in various fields, the video recognition unit 32 can recognize the face, an eye, or the like in a video.

Figure 2A:
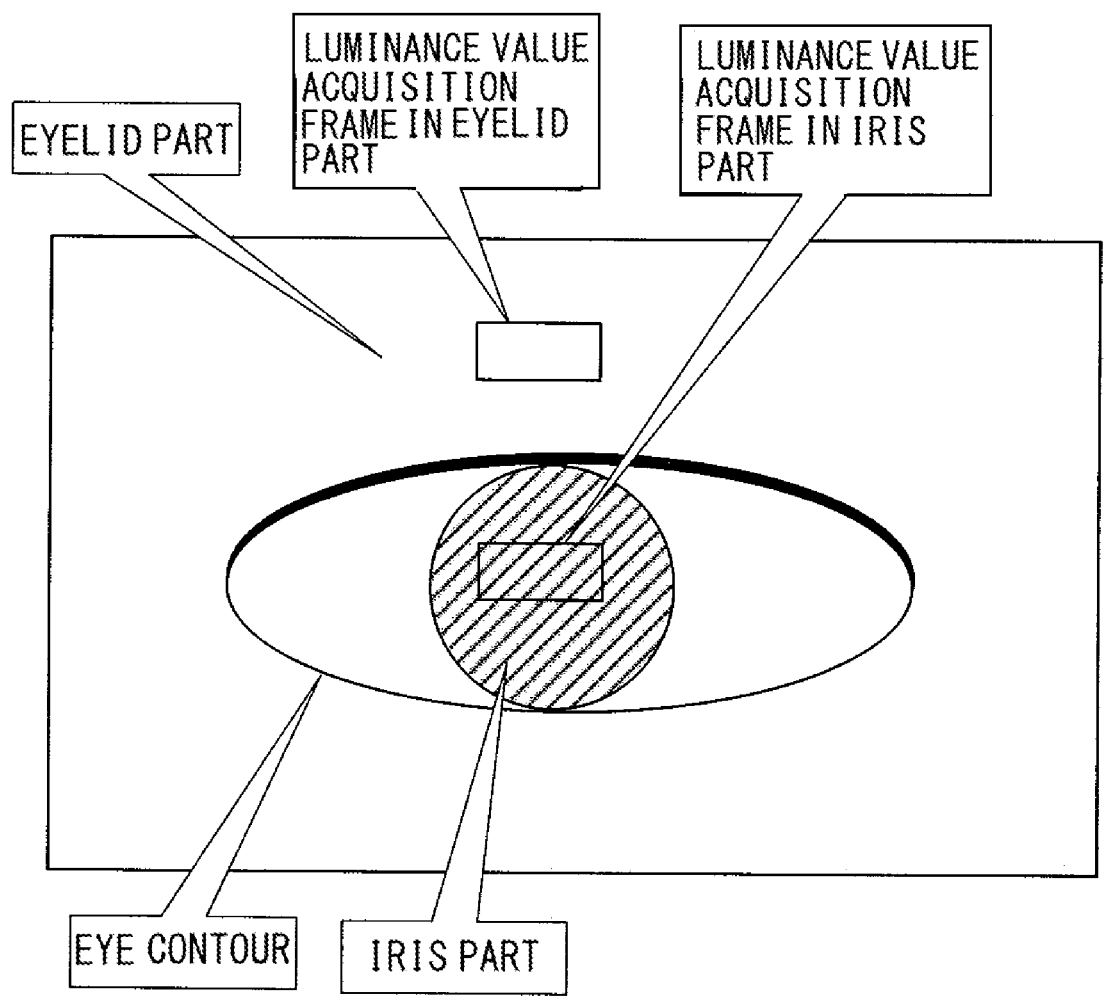
FIG. 2A is a schematic diagram used to describe acquisition of a luminance value in a state where an eye is open.
Figure 2B:
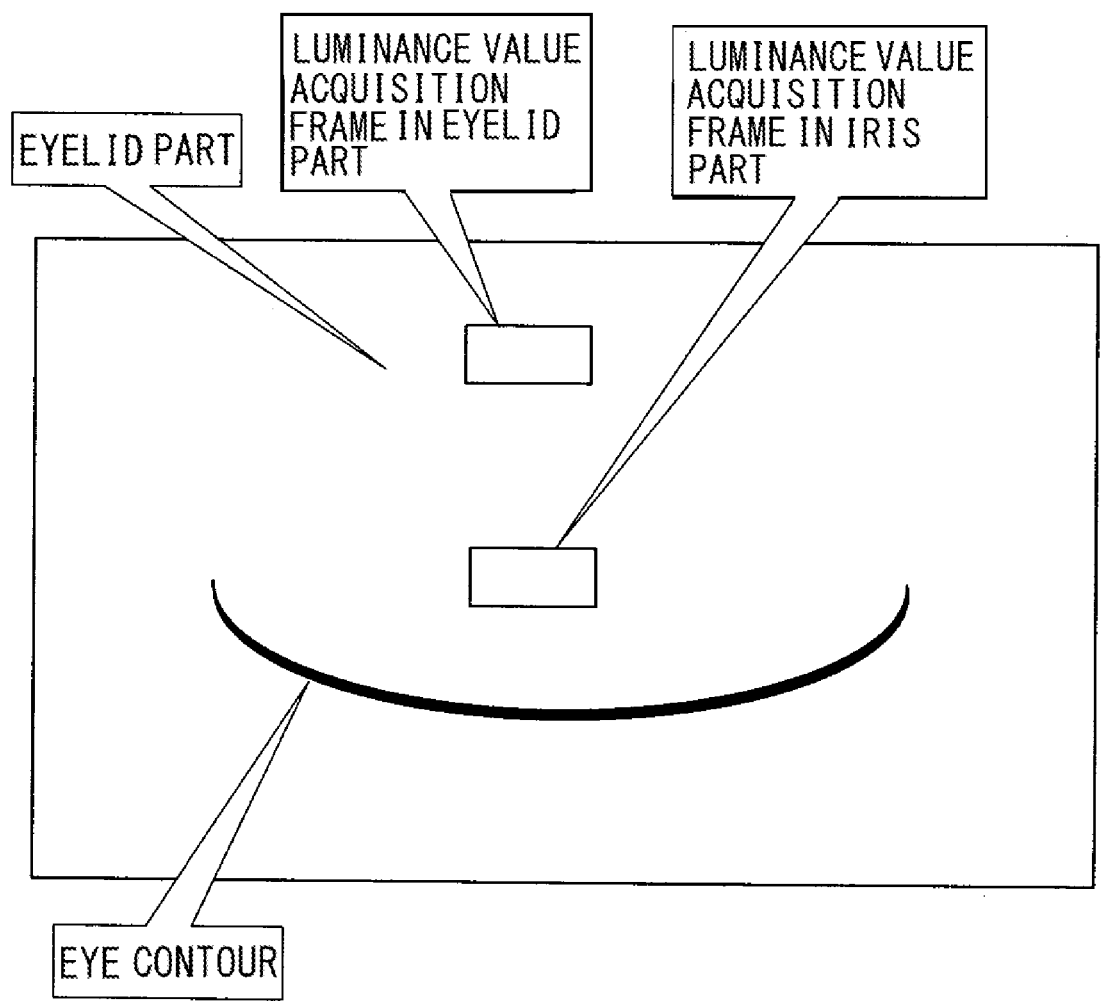
FIG. 2B is a schematic diagram used to describe acquisition of a luminance value in a state where an eye is closed.

The luminance value acquirer 33 acquires a luminance value X of the iris part and a luminance value Y of the eyelid part in an eye. FIG. 2A is a schematic diagram used to describe acquisition of a luminance value in a state where an eye is open, and FIG. 2B is a schematic diagram used to describe acquisition of a luminance value in a state where an eye is closed. The luminance value acquirer 33 acquires the luminance values of the iris part and the eyelid part within the respective frames shown as rectangles in each of FIGS. 2A and 2B. The luminance value acquirer 33 may calculate an average luminance value within a frame to acquire a luminance value, for example, so as to restrain variation in luminance adjustment caused by a local luminance value. The luminance value acquirer 33 outputs the luminance values thus acquired to the luminance difference calculator 34 and the luminance adjuster 35.

In the state where an eye is open as illustrated in FIG. 2A, the eyelid and the iris are shown within the respective frames in the eyelid part and the iris part, so that luminance values of the eyelid part and the iris part are acquired within the respective frames. Meanwhile, in the state where an eye is closed as illustrated in FIG. 2B, the eyelid is shown within both the frames of the eyelid part and the iris part, so that, within each of the frames, a luminance value of the eyelid part is acquired.

The luminance difference calculator 34 obtains the difference between the luminance values input from the luminance value acquirer 33 to calculate a luminance difference ΔB (ΔB=Y−X). For example, the luminance difference in the state where an eye is open as illustrated in FIG. 2A is larger than the luminance difference in the state where an eye is closed as illustrated in FIG. 2B. In the state of the closed eye illustrated in FIG. 2B, since the position of the frame, within which the luminance value is calculated, of the iris part is different from that of the eyelid part, the calculated luminance values of both the parts may be slightly different; however, it is envisaged that the values will be close to each other, and the luminance difference will show a smaller value.

Judgment on Whether Eye is Open or Closed

The luminance adjuster 35 adjusts the luminance of a video acquired by the video acquirer 31 such that the luminance values of the iris part and the eyelid part become desired values. First, the luminance adjuster 35 judges whether the eye is open or closed. For the judgment on whether the eye is open or closed, the luminance difference ΔB calculated by the luminance difference calculator 34 is compared with a predetermined luminance difference threshold ΔBs. When the luminance values of the iris part and the eyelid part are indicated using a gradation value between 0 and 255, the luminance difference threshold ΔBs may be set to around 20, for example, though the set value of the luminance difference threshold ΔBs is not limited thereto. When the luminance difference ΔB is greater than or equal to the luminance difference threshold ΔBs, the luminance adjuster 35 judges that the eye is open; when the luminance difference ΔB is smaller than the luminance difference threshold ΔBs, the luminance adjuster 35 judges that the eye is closed.

Upon judging that the eye is closed, the luminance adjuster 35 adjusts the luminance of the iris part and the eyelid part such that the luminance value Y of the eyelid part becomes equal to an eyelid luminance reference value Ls. The eyelid luminance reference value Ls may be set to 200 in the luminance range between 0 and 255, for example, though it also depends on the brightness setting in the image capturer 10. The set value of the luminance reference value Ls is not limited thereto and may be changed depending on the brightness in the image capturing environment, for example.

Adjustment to Iris Luminance Upper Threshold

Upon judging that the eye is open, the luminance adjuster 35 calculates an adjustment amount to adjust the luminance of the iris part and the eyelid part such that the luminance value of the iris part becomes smaller than or equal to an iris luminance upper threshold R1. The iris luminance upper threshold R1 may be set to around 50 in the luminance range between 0 and 255, for example, though the set value of the iris luminance upper threshold R1 is not limited thereto.

Figure 3A:
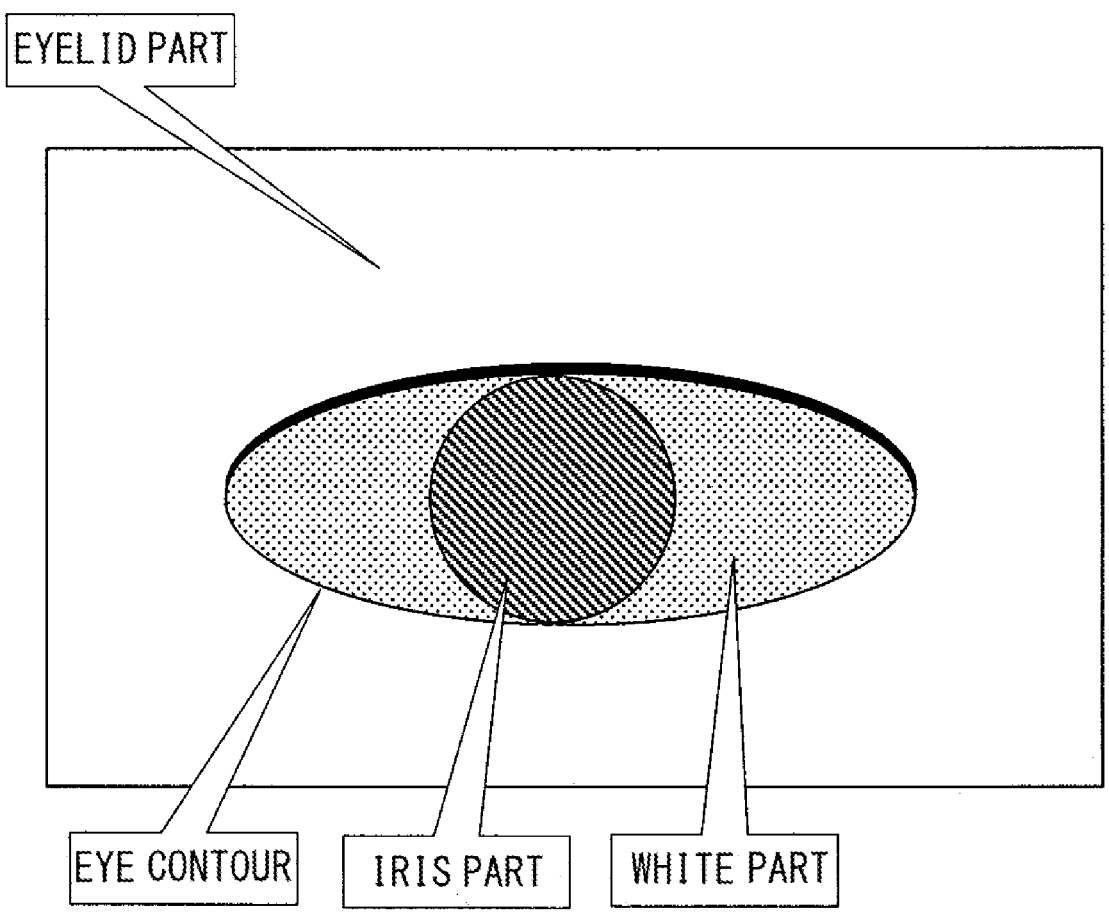
FIG. 3A is a schematic diagram that illustrates an eye captured by a visible light camera.
Figure 3B:
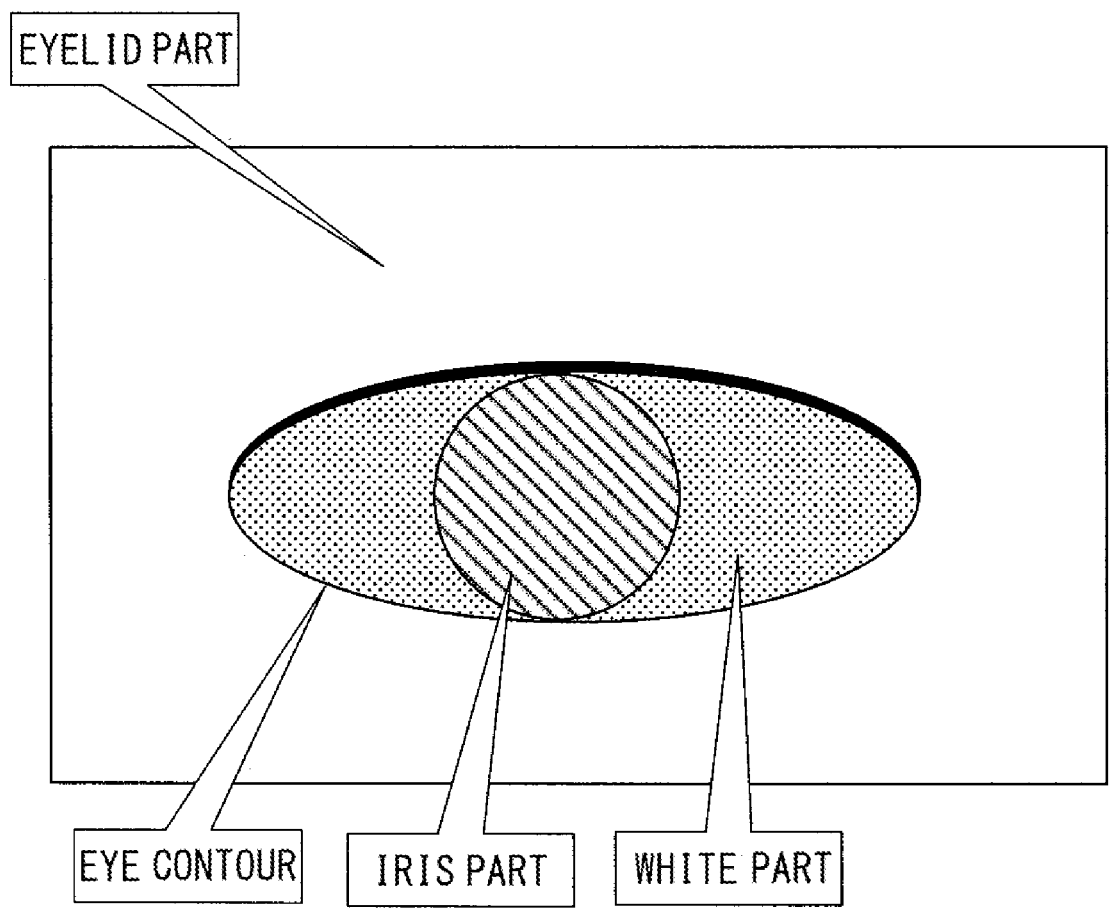
FIG. 3B is a schematic diagram that illustrates an eye captured by a near infrared camera.

FIG. 3A is a schematic diagram that illustrates an eye captured by a visible light camera, and FIG. 3B is a schematic diagram that illustrates an eye captured by a near infrared camera. In the video captured by a near infrared camera illustrated in FIG. 3B, the luminance value of the iris part is slightly higher and the luminance difference with the white part of the eye is smaller, compared to the video captured by a visible light camera illustrated in FIG. 3A. For example, a video as illustrated in FIG. 3B is obtained when the driver of the vehicle is irradiated with infrared light and captured in a dark condition during the nighttime. Accordingly, the luminance difference between the iris part and the eyelid part becomes smaller, and the luminance adjustment for these parts is required.

The luminance of the iris part and the eyelid part is adjusted such that the slightly higher luminance value of the iris part becomes smaller than or equal to the iris luminance upper threshold R1. The luminance value of the iris part acquired by the luminance value acquirer 33 is defined as X0, and the luminance value of the eyelid part acquired by the luminance value acquirer 33 is defined as Y0. The luminance adjuster 35 calculates an adjustment amount Δ1 (Δ1=X0−R1). A luminance value X1 of the iris part and a luminance value Y1 of the eyelid part after the luminance adjustment are given by the following equations.

$$X1 = X0 - \Delta 1 (= R1) \tag{1}$$

$$Y1 = Y0 - \Delta 1 \tag{2}$$

When the luminance value Y1 of the eyelid part is greater than or equal to an eyelid luminance lower threshold L1, the luminance adjuster 35 performs luminance adjustment on the image acquired by the video acquirer 31 using the adjustment amount Δ1 and terminates the processing. The eyelid luminance lower threshold L1 may be set to around 150 in the luminance range between 0 and 255, for example, though the set value of the eyelid luminance lower threshold L1 is not limited thereto.

Adjustment with Eyelid Luminance Lower Threshold

Figure 4A:
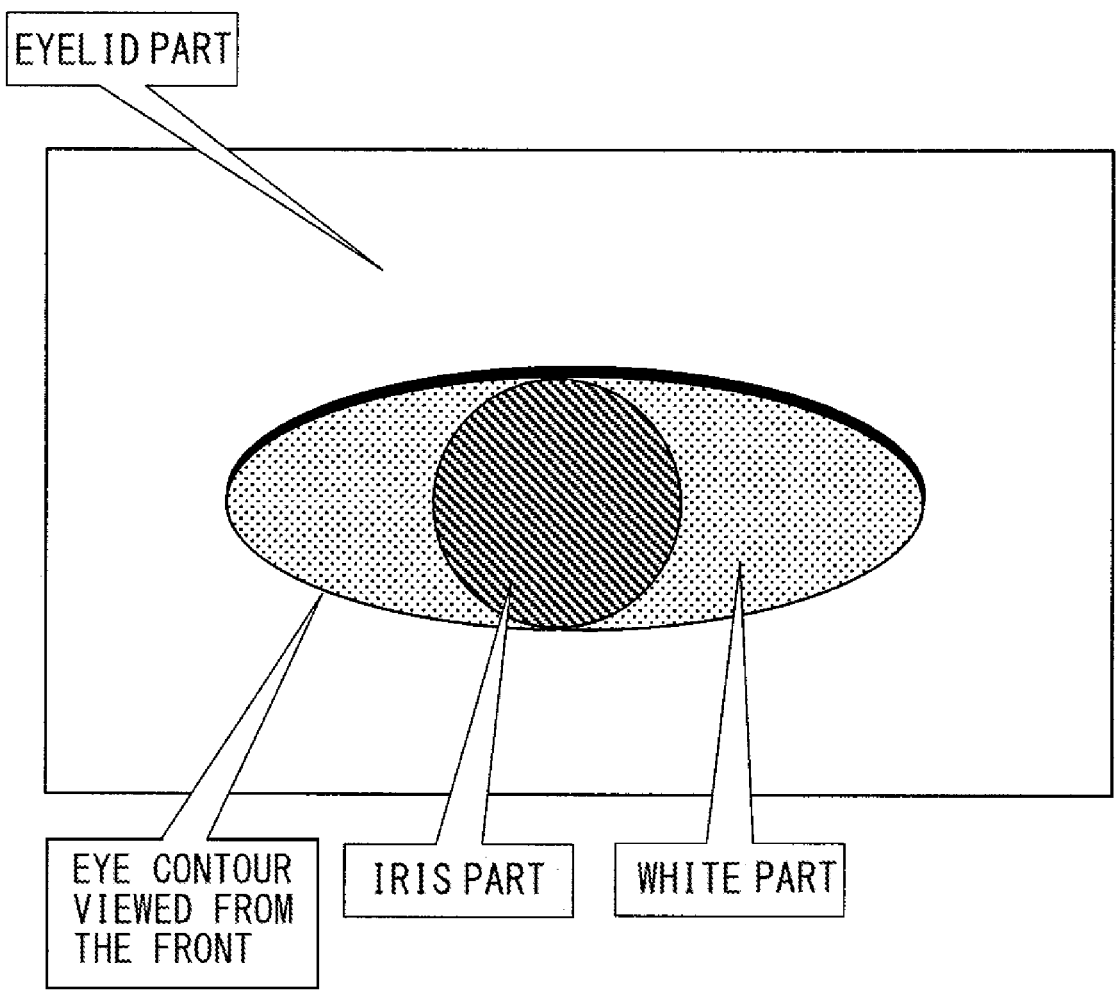
FIGS. 4A and 4B are schematic diagrams that each illustrate an eye captured in a situation where the angle of the eye with respect to the camera or the light condition is different.
Figure 4B:
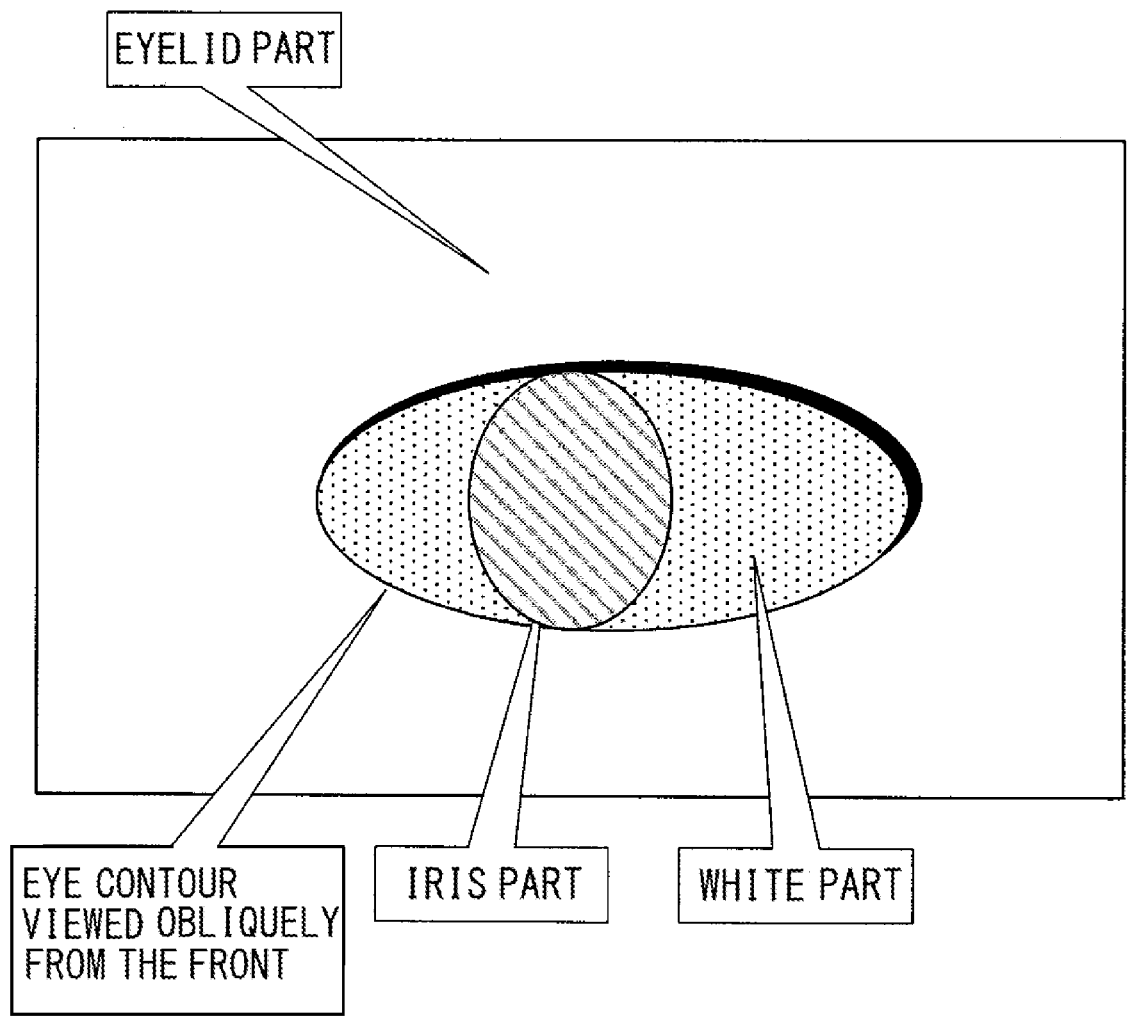

FIGS. 4A and 4B are schematic diagrams that each illustrate an eye captured in a situation where the angle of the eye with respect to the camera or the light condition is different. FIG. 4A shows a situation where the image capture object is captured from the front, and FIG. 4B shows a situation where the image capture object is captured obliquely from the front. The luminance value of the iris part in FIG. 4B is higher than the luminance value of the iris part in FIG. 4A, and the luminance difference between the iris part and the eyelid part is smaller in FIG. 4B.

When the luminance difference between the iris part and the eyelid part is small, if the luminance adjustment based on the aforementioned equations (1) and (2) is performed, the luminance value Y1 (=Y0−Δ1) of the eyelid part after the luminance adjustment will be excessively decreased to be lower than the eyelid luminance lower threshold L1. To moderate the excessive decrease of the luminance value and darkening of the video, the luminance adjuster 35 performs luminance adjustment such as to increase the luminance toward the eyelid luminance lower threshold L1 side. The luminance adjuster 35 employs an adjustment amount Δ2 (Δ2<Δ1), instead of the adjustment amount Δ1, and performs luminance adjustment as given by the following equations.

$$X1 = X0 - \Delta 2 \tag{3}$$

$$Y1 = Y0 - \Delta 2 \tag{4}$$

In this case, the luminance value X1 of the iris part after the luminance adjustment is larger than the iris luminance upper threshold R1, and the luminance value Y1 of the eyelid part after the luminance adjustment is smaller than the eyelid luminance lower threshold L1.

The adjustment amount Δ2 may be set such that the difference between the luminance value X1 after the luminance adjustment and the iris luminance upper threshold R1 becomes equivalent to the difference between the luminance value Y1 and the eyelid luminance lower threshold L1, for example. In this case, the following relational expression is obtained.

$$X1-R1=L1-Y1 \qquad (5)$$

The equations (3)-(5) are solved for $\Delta 2$ to obtain the following equation.

$$\Delta 2=\{(X0+Y0)-(R1+L1)\}/2 \qquad (6)$$

By employing the adjustment amount $\Delta 2$ obtained using the equation (6), the difference between the luminance value X1 and the iris luminance upper threshold R1 becomes equivalent to the difference between the luminance value Y1 and the eyelid luminance lower threshold L1, which corresponds to that the luminance adjuster 35 performs luminance adjustment such that each of the differences becomes minimum.

Figure 5:
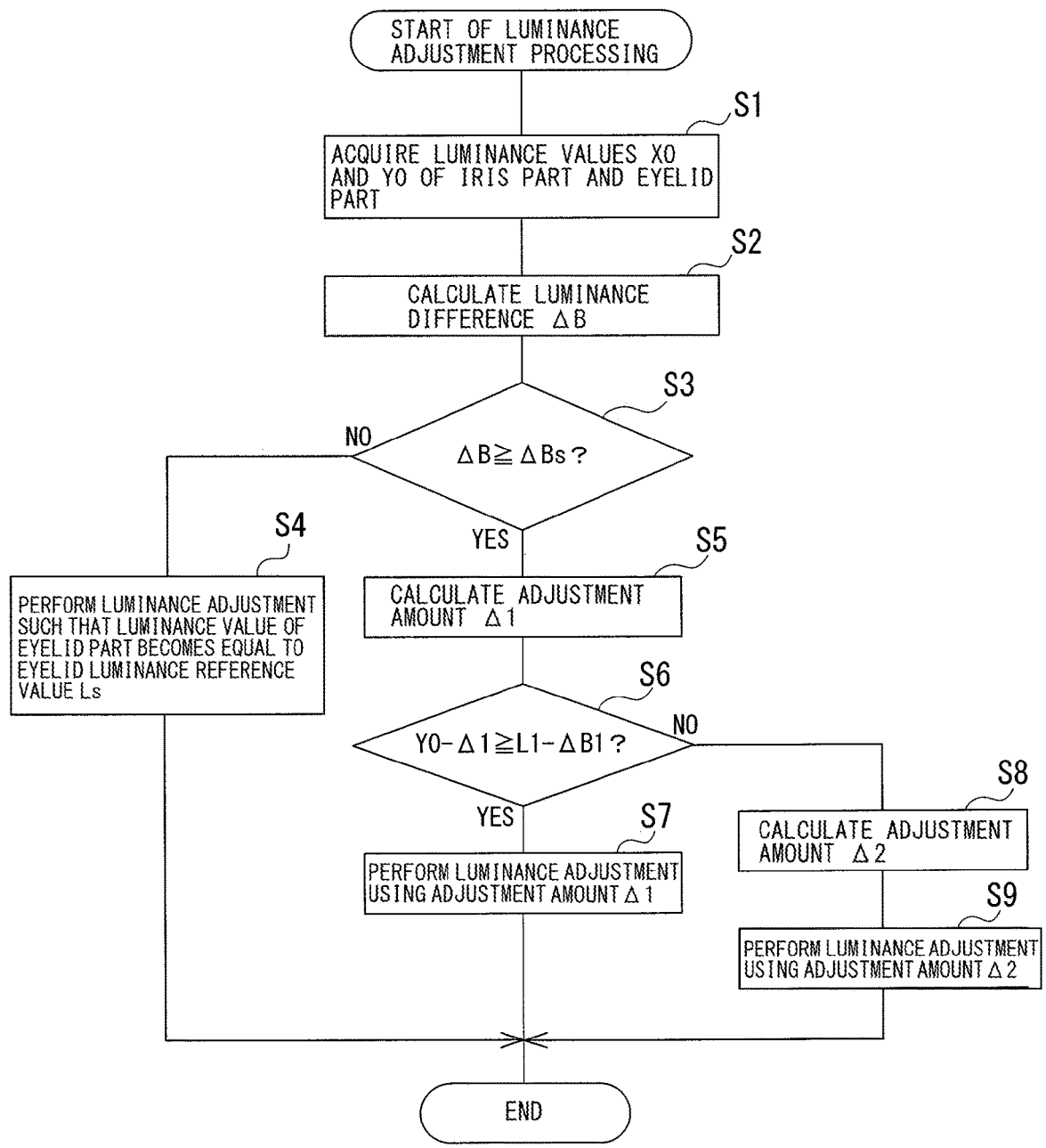
FIG. 5 is a flowchart that shows a procedure of luminance adjustment processing performed in the video processing device.

There will now be described the operation of the video processing device 30 based on luminance adjustment processing. FIG. 5 is a flowchart that shows a procedure of the luminance adjustment processing performed in the video processing device 30. The luminance value acquirer 33 of the video processing device 30 acquires the luminance value X0 of the iris part and the luminance value Y0 of the eyelid part (S1). The luminance difference calculator 34 calculates the luminance difference $\Delta B$ between the luminance value X0 and the luminance value Y0 (S2).

The luminance adjuster 35 compares the luminance difference $\Delta B$ and the luminance difference threshold $\Delta Bs$ for judgment (S3). When $\Delta B$ is smaller than $\Delta Bs$ (S3: NO), the luminance adjuster 35 judges that the eye is closed, performs luminance adjustment on the video such that the luminance value of the eyelid part becomes equal to the eyelid luminance reference value Ls (S4), and then terminates the processing. For example, when the luminance difference threshold $\Delta Bs$ is set to 20, the acquired luminance value X0 of the iris part is 195, and the acquired luminance value Y0 of the eyelid part is 210, the luminance difference $\Delta B$ is 15, so that the luminance adjuster 35 performs the process of the step S4.

When the luminance difference $\Delta B$ is greater than or equal to the luminance difference threshold $\Delta Bs$ at the step S3 (S3: YES), the luminance adjuster 35 calculates the adjustment amount $\Delta 1$ ($\Delta 1=X0-R1$) (S5). The luminance adjuster 35 uses a luminance decrease threshold $\Delta B1$ from the eyelid luminance lower threshold L1 to judge whether or not the luminance value of the eyelid part is excessively decreased by the adjustment amount $\Delta 1$. More specifically, when the luminance value of the eyelid part after the adjustment is greater than or equal to $L1-\Delta B1$, it is judged that the luminance value is not excessively decreased; when the luminance value is smaller than $L1-\Delta B1$, it is judged that the luminance value is excessively decreased. The luminance adjuster 35 judges whether $Y0-\Delta 1$, which is the luminance value after the adjustment, is greater than or equal to $L1-\Delta B1$ (S6). When $Y0-\Delta 1$ is greater than or equal to $L1-\Delta B1$ (S6: YES), the luminance adjuster 35 performs luminance adjustment on the video using the adjustment amount $\Delta 1$ (S7) and terminates the processing.

For instance, an example is considered here in which the iris luminance upper threshold R1 is set to 50, the eyelid luminance lower threshold L1 is set to 150, and the luminance decrease threshold $\Delta B1$ is set to 20, the acquired luminance value X0 of the iris part is 120, and the acquired luminance value Y0 of the eyelid part is 210. Accordingly, the adjustment amount $\Delta 1$, i.e., X0-R1, is 70, so that $Y0-\Delta 1$ is 140, and $L1-\Delta B1$ is 130. Thus, the luminance value of the eyelid part after the adjustment with the adjustment amount $\Delta 1$ is 140, which is lower than the eyelid luminance lower threshold L1 but within the luminance decrease threshold $\Delta B1$ of the eyelid luminance lower threshold L1. Accordingly, luminance adjustment is performed on the video using the adjustment amount $\Delta 1$ at the step S7.

When $Y0-\Delta 1$ is smaller than $L1-\Delta B1$ (S6: NO), the luminance adjuster 35 calculates the adjustment amount $\Delta 2$ using the aforementioned equation (6) (S8). Accordingly, the luminance adjuster 35 performs luminance adjustment on the video using the adjustment amount $\Delta 2$ thus calculated (S9) and terminates the processing.

For instance, in the aforementioned example, a case is considered in which the acquired luminance value X0 of the iris part is 140, and the acquired luminance value Y0 of the eyelid part is 210. Accordingly, the adjustment amount $\Delta 1$, i.e., X0-R1, is 90, so that $Y0-\Delta 1$ is 120, and $L1-\Delta B1$ is 130. This means that the judgement at the step S6 is NO, and the adjustment amount $\Delta 2$ is calculated at the step S8. Accordingly, the luminance adjuster 35 calculates the adjustment amount $\Delta 2$ as 75 based on the equation (6) and performs luminance adjustment on the video using the adjustment amount $\Delta 2$ thus calculated.

The luminance adjuster 35 of the video processing device 30 adjusts the luminance such that the luminance values of the iris part and the eyelid part respectively become closer to the iris luminance upper threshold R1 and the eyelid luminance lower threshold L1. In other words, the luminance adjuster 35 performs luminance adjustment using the aforementioned adjustment amount $\Delta 2$ so that the luminance value of the eyelid part is not excessively decreased. Accordingly, the video processing device 30 performs luminance adjustment not only on the iris part but also the eyelid part therearound, which restrains reduction of distinguishability between the eye part including the iris and the eyelid part therearound and enables luminance adjustment suitable for analysis related to the eye part. For example, in the analysis related to the eye part, image recognition of a contour between the eyelid part and the iris is performed, and the degree of opening of the eye or the like is calculated based on the contour.

Also, the luminance adjuster 35 performs luminance adjustment such that each of the difference between the luminance value of the iris part and the iris luminance upper threshold R1 and the difference between the luminance value of the eyelid part and the eyelid luminance lower threshold L1 becomes minimum. The luminance adjuster 35 may calculate the adjustment amount $\Delta 2$ based on the aforementioned equation (6), for example, to perform balanced luminance adjustment such that the luminance values of the iris part and the eyelid part become closer to the respective thresholds.

Second Embodiment

Figure 6A:
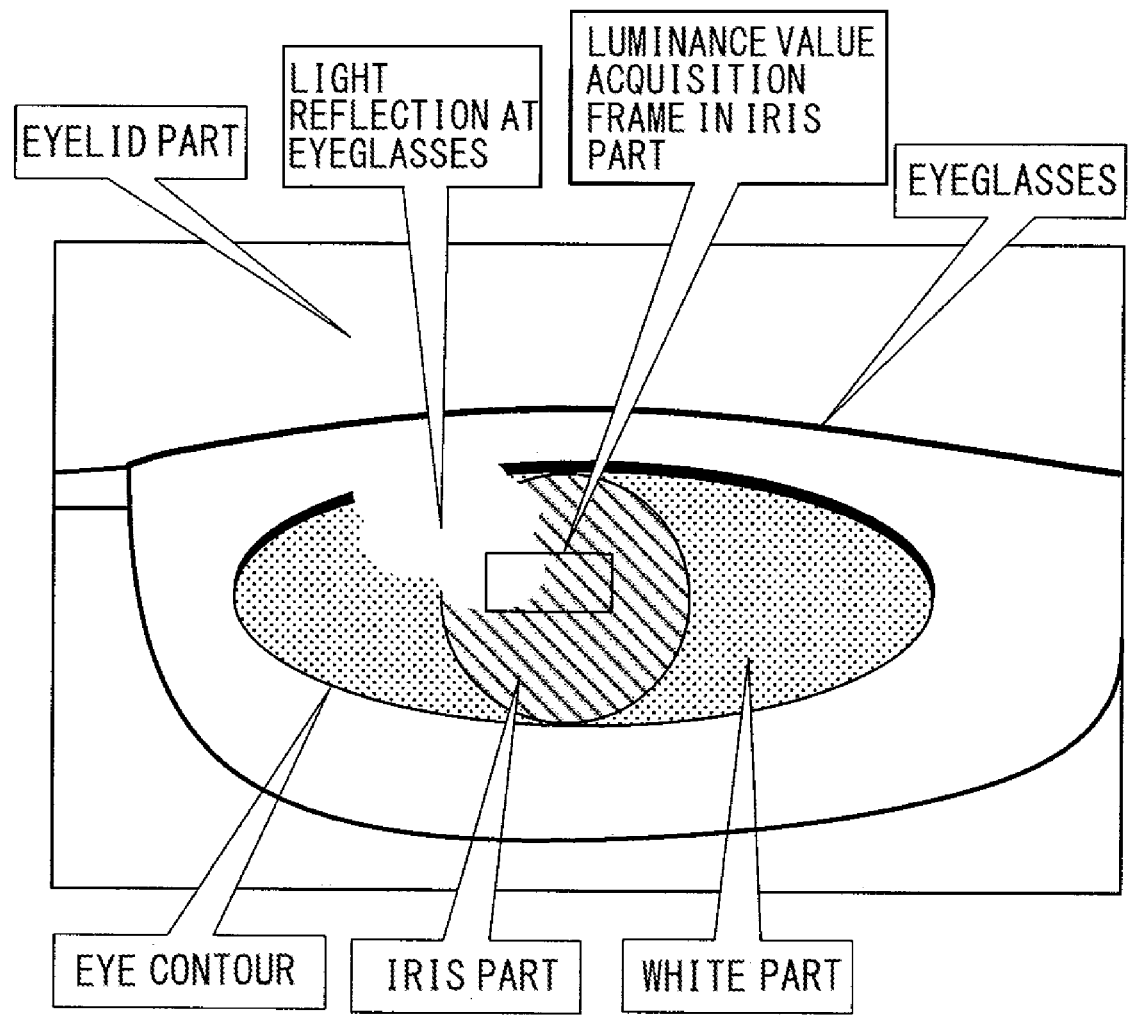
FIG. 6A is a schematic diagram that illustrates an example in which a portion with a high luminance value is generated by reflection at eyeglasses.

In a video acquired by the video acquirer 31, the iris part and the eyelid part may include a portion having a higher luminance value than the vicinity thereof. The video processing device 30 according to the second embodiment acquires a luminance value, excluding such a portion having a luminance value that is greater than or equal to a predetermined threshold and is higher than the luminance value of the vicinity thereof. FIG. 6A is a schematic diagram that illustrates an example in which a portion with a high luminance value is generated by reflection at eyeglasses, and FIG. 6B is a schematic diagram that illustrates an example in which a portion with a high luminance value is generated by corneal reflection.

In the example shown in FIG. 6A, when an average luminance value of the iris part is calculated by the luminance value acquirer 33, an error may be caused because of extremely high luminance in the portion where light is reflected. Accordingly, the luminance value acquirer 33 calculates an average luminance value of the iris part excluding a portion having a luminance value that is greater than or equal to a predetermined threshold and is extremely higher than the luminance value of the vicinity thereof. By setting the average luminance value as the luminance value of the iris part, luminance value errors can be reduced.

Figure 6B:
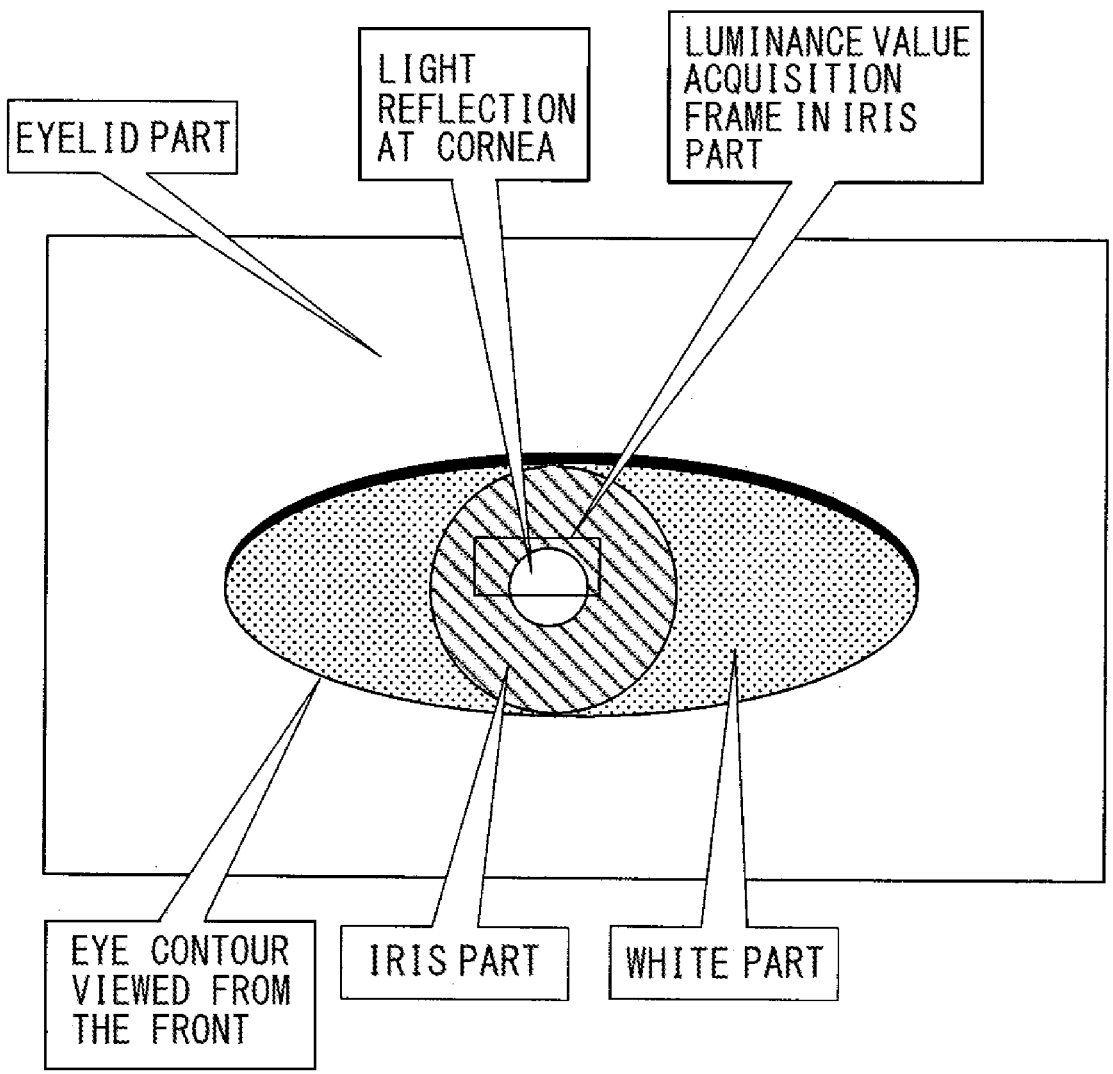
FIG. 6B is a schematic diagram that illustrates an example in which a portion with a high luminance value is generated by corneal reflection.

The corneal reflection shown in FIG. 6B occurs when a near infrared camera is used as the image capturer 10 to capture an image while a near infrared LED emits light, for example, and reflection of light at the cornea makes the luminance extremely high. Also in this example, when an average luminance value of the iris part is calculated by the luminance value acquirer 33, an error may be caused because of extremely high luminance in the portion where light is reflected. Accordingly, the luminance value acquirer 33 calculates an average luminance value of the iris part excluding a portion having a luminance value that is greater than or equal to a predetermined threshold and is extremely higher than the luminance value of the vicinity thereof. By setting the average luminance value as the luminance value of the iris part, luminance value errors can be reduced. Also, the luminance value acquirer 33 may arrange the pixels within a video, for which luminance values are calculated, in descending order of luminance and calculate an average luminance value of about a half of the pixels having lower luminance, for example. By setting the average luminance value as the luminance value of the iris part, luminance value errors can be reduced.

Third Embodiment

Figure 7:
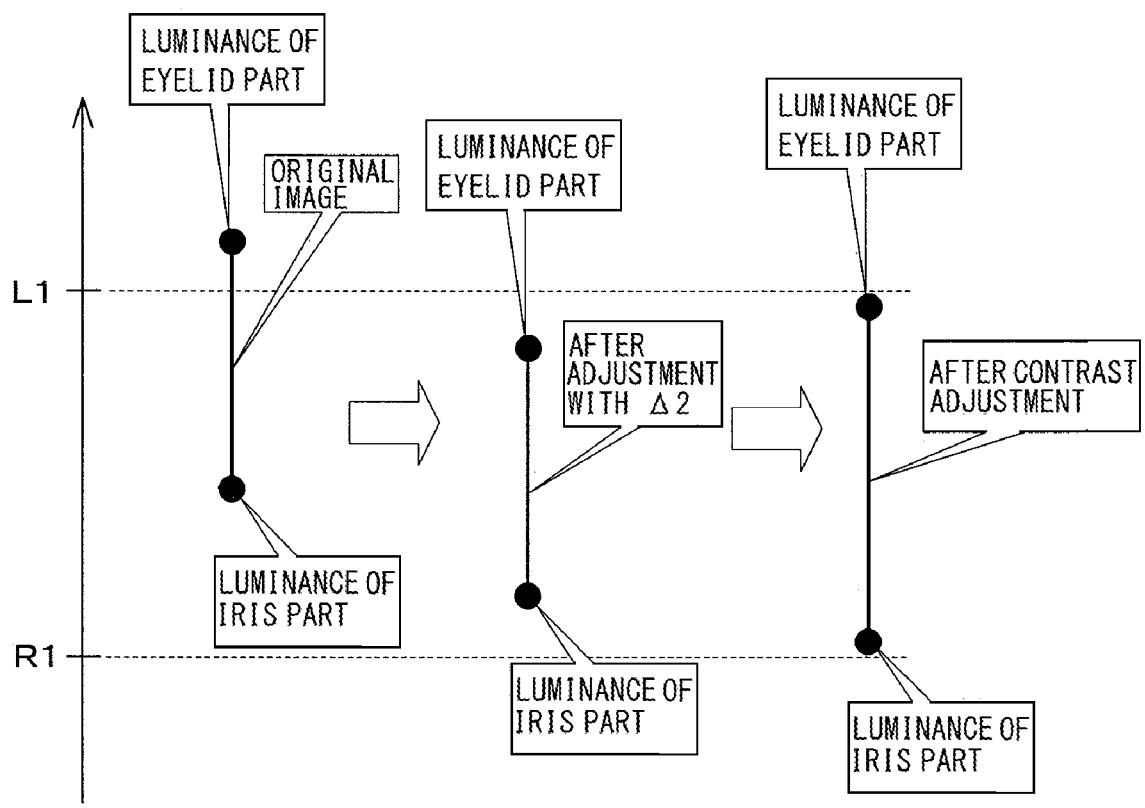
FIG. 7 is a schematic diagram used to describe contrast adjustment.

In the aforementioned first embodiment, the luminance adjuster 35 performs luminance adjustment on a video using the adjustment amount Δ2. The luminance adjuster 35 may further perform luminance adjustment such as to increase the contrast between the iris part and the eyelid part. FIG. 7 is a schematic diagram used to describe contrast adjustment. The luminance adjuster 35 performs luminance adjustment on a video using the adjustment amount Δ2 and then performs luminance adjustment to increase the contrast.

For instance, a case is considered in which the acquired luminance value X0 of the iris part described previously is 140, and the acquired luminance value Y0 of the eyelid part is 210. Also, the iris luminance upper threshold R1 is set to 50, the eyelid luminance lower threshold L1 is set to 150, and the luminance decrease threshold ΔB1 is set to 20. As described previously, the luminance adjuster 35 calculates the adjustment amount Δ2 as 75 and performs luminance adjustment on the video using the adjustment amount Δ2 thus calculated. As a result, in the video after the luminance adjustment, the luminance value of the iris part is adjusted to 65, and the luminance value of the eyelid part is adjusted to 135. If the difference between the original luminance value X0 of the iris part and the original luminance value Y0 of the eyelid part is further smaller, the luminance value of the iris part after the luminance adjustment will be further higher, and the luminance value of the eyelid part after the luminance adjustment will be further lower.

After the luminance adjustment using the adjustment amount Δ2, the luminance adjuster 35 further performs processing for increasing the contrast with the intermediate value between the luminance value of the iris part and the luminance value of the eyelid part as the center. In the abovementioned example, the contrast is increased with the luminance value of 100 as the center, which is the intermediate value between 65 as the luminance value of the iris part and 135 as the luminance value of the eyelid part. Increasing the contrast by the luminance adjuster 35 can make the luminance value of the iris part further closer to the iris luminance upper threshold R1 and also make the luminance value of the eyelid part further closer to the eyelid luminance lower threshold L1, so that distinguishing between the iris part and the eyelid part can be made easier. Also, increasing the contrast by the luminance adjuster 35 can restrain occurrence of clipped blacks in the eyelid part or clipped whites in the iris part in a video after the luminance adjustment.

There will now be described the features of the video processing device 30, a video processing method, and a video processing program according to each of the aforementioned embodiments.

The video processing device 30 according to an embodiment includes the video acquirer 31, the video recognition unit 32, the luminance value acquirer 33, and the luminance adjuster 35. The video acquirer 31 acquires a video in which the face of an image capture object is captured. The video recognition unit 32 recognizes an iris part and an eyelid part in a video acquired by the video acquirer 31. The luminance value acquirer 33 acquires a luminance value of each of the iris part and the eyelid part recognized by the video recognition unit 32. The luminance adjuster 35 adjusts a luminance value of a video such that the luminance values of the iris part and the eyelid part acquired by the luminance value acquirer 33 respectively become closer to the certain iris luminance upper threshold R1 in the iris part and the certain eyelid luminance lower threshold L1 in the eyelid part. Accordingly, the video processing device 30 performs luminance adjustment not only on the iris part but also the eyelid part therearound, which restrains reduction of distinguishability between the eye part including the iris and the eyelid part therearound and enables luminance adjustment suitable for analysis related to the eye part.

Also, the luminance adjuster 35 performs luminance adjustment such that the difference between the luminance value of the iris part and the iris luminance upper threshold R1 becomes equivalent to the difference between the luminance value of the eyelid part and the eyelid luminance lower threshold L1. Accordingly, the video processing device 30 can perform balanced luminance adjustment such that the luminance values of the iris part and the eyelid part become closer to the respective thresholds.

Also, the luminance value acquirer 33 acquires an averaged luminance value of each of the iris part and the eyelid part. Accordingly, the video processing device 30 restrains variation in luminance adjustment caused by a local luminance value.

Also, the luminance value acquirer 33 acquires a luminance value in at least one of the iris part and the eyelid part, excluding a portion having a luminance value greater than or equal to a predetermined threshold. Accordingly, the video processing device 30 can acquire a luminance value, excluding a portion with extremely high luminance caused by various kinds of reflection, for example.

The luminance adjuster 35 also increases the contrast between the luminance values of the iris part and the eyelid part. Accordingly, the video processing device 30 can make the luminance value of the iris part further closer to the iris luminance upper threshold R1 and also make the luminance value of the eyelid part further closer to the eyelid luminance lower threshold L1, so that distinguishing between the iris part and the eyelid part can be made easier.

A video processing method according to an embodiment includes a video acquiring step, a video recognition step, a luminance value acquiring step, and a luminance adjustment step. The video acquiring step acquires a video in which the face of an image capture object is captured. The video recognition step recognizes an iris part and an eyelid part in a video acquired in the video acquiring step. The luminance value acquiring step acquires a luminance value of each of the iris part and the eyelid part recognized in the video recognition step. The luminance adjustment step adjusts a luminance value of a video such that the luminance values of the iris part and the eyelid part acquired in the luminance value acquiring step respectively become closer to the certain iris luminance upper threshold R1 in the iris part and the certain eyelid luminance lower threshold L1 in the eyelid part. With the video processing method, luminance adjustment is performed not only on the iris part but also the eyelid part therearound, which restrains reduction of distinguishability between the eye part including the iris and the eyelid part therearound and enables luminance adjustment suitable for analysis related to the eye part.

A non-transitory recording medium for video processing encoded with a program according to an embodiment causes a computer to implement a video acquiring step, a video recognition step, a luminance value acquiring step, and a luminance adjustment step. The video acquiring step acquires a video in which the face of an image capture object is captured. The video recognition step recognizes an iris part and an eyelid part in a video acquired in the video acquiring step. The luminance value acquiring step acquires a luminance value of each of the iris part and the eyelid part recognized in the video recognition step. The luminance adjustment step adjusts a luminance value of a video such that the luminance values of the iris part and the eyelid part acquired in the luminance value acquiring step respectively become closer to the certain iris luminance upper threshold R1 in the iris part and the certain eyelid luminance lower threshold L1 in the eyelid part. With the video processing program, luminance adjustment is performed not only on the iris part but also the eyelid part therearound, which restrains reduction of distinguishability between the eye part including the iris and the eyelid part therearound and enables luminance adjustment suitable for analysis related to the eye part.

The present invention has been described with reference to embodiments. The embodiments are intended to be illustrative only, and it will be obvious to those skilled in the art that various modifications and changes could be developed within the scope of claims of the present invention and that such modifications and changes also fall within the scope of claims of the present invention. Therefore, the description in the present specification and the drawings should be regarded as exemplary rather than limitative.

What is claimed is:

1. A video processing device, comprising a CPU operating according to a computer program to perform processing including:
   acquiring a video continuously in time in which an image capture object is captured;
   recognizing an image of a face and an eye of the image capture object in the video acquired by the CPU;
   acquiring a luminance value of each of an iris part and an eyelid part based on acquiring a luminance value within predetermined frames of the iris part and the eyelid part respectively located at an iris and eyelid when the eye is open from the image recognized by the CPU;
   calculating an adjustment amount based on a predetermined iris luminance upper threshold in the iris part and the luminance value of the iris part that have been already acquired; and
   adjusting a luminance value of the video based on a luminance adjustment such that the luminance value of the iris part and the luminance value of the eyelid part acquired by the CPU respectively become closer to the predetermined iris luminance upper threshold in the iris part and a predetermined eyelid luminance lower threshold in the eyelid part in the image recognized by the CPU,
   wherein the adjusting the luminance value includes adjusting the luminance values of the iris part and the eyelid part by subtracting the adjustment amount from the luminance values of the iris part and the eyelid part, respectively, if the luminance value of the eyelid part after the luminance adjustment is not lower than the predetermined eyelid luminance lower threshold minus a luminance decrease threshold of an eyelid luminance lower threshold, the adjustment amount is represented by:

$\Delta 1 = X0 - R1$, wherein $\Delta 1$ is the adjustment amount,
   X0 is the luminance value of the iris part that have been already acquired, and
   R1 is the predetermined iris luminance upper threshold, and if the luminance value of the eyelid part after the luminance adjustment is lower than the predetermined eyelid luminance lower threshold minus the luminance decrease threshold of the eyelid luminance lower threshold, adjusting the luminance values of the iris part and the eyelid part by subtracting another adjustment amount instead of the adjustment amount from the luminance values of the iris part and the eyelid part, respectively, the another adjustment amount is represented by:

$\Delta 2 = \{(X0 + Y0) - (R1 + L1)\}/2$, wherein $\Delta 2$ is the another adjustment amount,
   Y0 is the luminance value of the eyelid part that have been already acquired, and
   L1 is the eyelid luminance lower threshold.

2. The video processing device according to claim 1, wherein the CPU performs the luminance adjustment such that the difference between the luminance value of the iris part and the iris luminance upper threshold becomes equivalent to the difference between the luminance value of the eyelid part and the eyelid luminance lower threshold.

3. The video processing device according to claim 1, wherein the CPU acquires an averaged luminance value within the predetermined frames of each of the iris part and the eyelid part.

4. The video processing device according to claim 1, wherein the CPU acquires the luminance value in at least one of the iris part and the eyelid part, excluding a portion having the luminance value greater than or equal to a predetermined threshold.

5. The video processing device according to claim 1, wherein the CPU further increases the contrast between the luminance values of the iris part and the eyelid part.

6. A video processing method, comprising:
   acquiring a video continuously in time in which an image capture object is captured;

recognizing an image of a face and an eye of the image capture object in the video acquired in the acquiring a video;

acquiring a luminance value of each of an iris part and an eyelid part based on acquiring a luminance value within predetermined frames of the iris part and the eyelid part respectively located at an iris and eyelid when the eye is open from the image recognized in the recognizing;

calculating an adjustment amount based on a predetermined iris luminance upper threshold in the iris part and the luminance value of the iris part that have been already acquired; and adjusting a luminance value of the video based on a luminance adjustment such that the luminance value of the iris part and the luminance value of the eyelid part acquired in the acquiring a luminance value respectively become closer to the predetermined iris luminance upper threshold in the iris part and a predetermined eyelid luminance lower threshold in the eyelid part in the image recognized by the video recognition unit, wherein the adjusting the luminance value includes adjusting the luminance values of the iris part and the eyelid part by subtracting the adjustment amount from the luminance values of the iris part and the eyelid part, respectively, if the luminance value of the eyelid part after the luminance adjustment is not lower than the predetermined eyelid luminance lower threshold minus a luminance decrease threshold of an eyelid luminance lower threshold, the adjustment amount is represented by:

$$\Delta 1 = X0 - R1, \text{ wherein}$$

$\Delta 1$ is the adjustment amount,

X0 is the luminance value of the iris part that have been already acquired, and

R1 is the predetermined iris luminance upper threshold, and if the luminance value of the eyelid part after the luminance adjustment is lower than the predetermined eyelid luminance lower threshold minus the luminance decrease threshold of the eyelid luminance lower threshold, adjusting the luminance values of the iris part and the eyelid part by subtracting another adjustment amount instead of the adjustment amount from the luminance values of the iris part and the eyelid part, respectively, the another adjustment amount is represented by:

$$\Delta 2 = \{(X0 + Y0) - (R1 + L1)\}/2, \text{ wherein}$$

$\Delta 2$ is the another adjustment amount,

Y0 is the luminance value of the eyelid part that have been already acquired, and L1 is the eyelid luminance lower threshold.

7. A non-transitory recording medium for video processing encoded with a program causing a computer to implement:

acquiring a video continuously in time in which an image capture object is captured;

recognizing an image of a face and an eye of the image capture object in the video acquired in the acquiring a video;

acquiring a luminance value of each of an iris part and an eyelid part based on acquiring a luminance value within predetermined frames of the iris part and the eyelid part respectively located at an iris and eyelid when the eye is open from the image recognized in the recognizing;

calculating an adjustment amount based on a predetermined iris luminance upper threshold in the iris part and the luminance value of the iris part that have been already acquired; and adjusting a luminance value of the video based on a luminance adjustment such that the luminance value of the iris part and the luminance value of the eyelid part acquired in the acquiring a luminance value respectively become closer to the predetermined iris luminance upper threshold in the iris part and a predetermined eyelid luminance lower threshold in the eyelid part in the image recognized by the video recognition unit, wherein the adjusting the luminance value includes adjusting the luminance values of the iris part and the eyelid part by subtracting the adjustment amount from the luminance values of the iris part and the eyelid part, respectively, if the luminance value of the eyelid part after the luminance adjustment is not lower than the predetermined eyelid luminance lower threshold minus a luminance decrease threshold of an eyelid luminance lower threshold, the adjustment amount is represented by:

$$\Delta 1 = X0 - R1, \text{ wherein}$$

$\Delta 1$ is the adjustment amount,

X0 is the luminance value of the iris part that have been already acquired, and

R1 is the predetermined iris luminance upper threshold, and if the luminance value of the eyelid part after the luminance adjustment is lower than the predetermined eyelid luminance lower threshold minus the luminance decrease threshold of the eyelid luminance lower threshold, adjusting the luminance values of the iris part and the eyelid part by subtracting another adjustment amount instead of the adjustment amount from the luminance values of the iris part and the eyelid part, respectively, the another adjustment amount is represented by:

$$\Delta 2 = \{(X0 + Y0) - (R1 + L1)\}/2, \text{ wherein}$$

$\Delta 2$ is the another adjustment amount,

Y0 is the luminance value of the eyelid part that have been already acquired, and L1 is the eyelid luminance lower threshold.

* * * * *